United States Patent
Schwarz et al.

(10) Patent No.: US 7,839,227 B2
(45) Date of Patent: Nov. 23, 2010

(54) OSCILLATING CIRCUIT HAVING AN ANALOG OSCILLATING ELEMENT

(75) Inventors: Hans-Dieter Schwarz, Balingen (DE); Arnd Gangei, Eningen (DE); Wolfram Bauer, Tuebingen (DE); Gerhard Wucher, Reutlingen (DE); Christoph Lang, Palo Alto, CA (US); Ermin Esch, Pliezhausen (DE); Michael Veith, Reutlingen (DE); Thomas Mayer, Pfallingen (DE); Markus Brockmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 11/794,780

(22) PCT Filed: Dec. 9, 2005

(86) PCT No.: PCT/EP2005/056658
§ 371 (c)(1),
(2), (4) Date: Aug. 11, 2008

(87) PCT Pub. No.: WO2006/072531
PCT Pub. Date: Jul. 13, 2006

(65) Prior Publication Data
US 2008/0297264 A1     Dec. 4, 2008

(30) Foreign Application Priority Data
Jan. 5, 2005  (DE) ........................ 10 2005 000 745

(51) Int. Cl.
*H03B 5/30* (2006.01)

(52) U.S. Cl. ............... 331/154; 331/116 M; 73/514.32; 324/658

(58) Field of Classification Search .................. 331/154, 331/116 M; 73/514.32; 324/658
See application file for complete search history.

(56) References Cited

U.S. PATENT DOCUMENTS 6,817,244 B2 * 11/2004 Platt ........................ 73/504.16
7,616,244 B2 * 11/2009 Kobayashi et al. .......... 348/308

FOREIGN PATENT DOCUMENTS

| EP | 0 642 216 | 3/1995 |
|----|-----------|--------|
| JP | 7-170152 | 7/1995 |
| JP | 10-332381 | 12/1998 |
| WO | WO 2004/023075 | 3/2004 |
| WO | WO 2004/046650 | 6/2004 |

OTHER PUBLICATIONS

International Search Report, PCT International Patent Application No. PCT/EP2005/056658, dated Feb. 21, 2006.
Patent Abstracts of Japan, vol. 1999, No. 3, Mar. 31, 1999.

* cited by examiner

*Primary Examiner*—Arnold Kinkead
(74) *Attorney, Agent, or Firm*—Kenyon & Kenyon LLP

(57) ABSTRACT

An oscillating circuit includes an analog oscillation element. The oscillating circuit includes at least one analog-to-digital conversion device. A method is for operating an oscillating circuit, in which a mechanical oscillator oscillates at a natural frequency. The oscillation amplitude is measured and digitized. A digital control signal is generated from this with the aid of a digital amplitude controller. A driving signal is generated, in turn, from the digital control signal, the driving signal driving the mechanical oscillator with the aid of a drive unit. This control loop stabilizes the oscillation amplitude.

14 Claims, 5 Drawing Sheets

OSCILLATING CIRCUIT HAVING AN ANALOG OSCILLATING ELEMENT

FIELD OF THE INVENTION

The present invention relates to an oscillating circuit having an analog oscillating element.

Example embodiments of the present invention are described in the following using a yaw-rate sensor as an example. In principle, however, it is applicable to all types of resonators.

BACKGROUND INFORMATION

Many yaw-rate sensors are based on the use of the Coriolis effect as a measuring principle. The Coriolis force occurs when a body of mass m moves at velocity v, and a rate of rotation Ω acts in a direction perpendicular to the direction of movement, where Fcoriolis=2mvxΩ.

One option for setting a weight into motion is to excite it into oscillation, the driving oscillation.

If a rate of rotation acts on the oscillating weight, then the Coriolis forces cause it to react with a Coriolis oscillation perpendicular to the driving oscillation. If the mechanism is combined with electronics to form an oscillating circuit, then a resonator is formed, and the frequency of this driving oscillation corresponds to the resonant driving frequency of the mechanism. In the related art, these electronics are analog.

A rotation-rate sensor that functions according to this principle is described in the document "PA Low Cost Angular Rate Sensor in Si-Surface Micromachining Technology for Automotive Applications" by A. Thomae, R. Schellin, M. Lang, W. Bauer, J. Morhaupt, G. Bischopink, L. Tanten, H. Baumann, H. Emmerich, S. Pinter, J. Marek, K. Funk, G. Lorenz, R. Neul; SAE, 1999. In this microsystem, a deflection of the movable sensor weight causes a change in capacitance at micromechanical detection electrodes. These changes in capacitance are measured by analog electronics. A voltage generated by an analog controller is applied to further electrodes at the sensor element, the driving electrodes. This voltage generates an electrostatic force in the sensor element. When the periodic driving force is in suitable phase relation to the oscillation of the movable weight measured via the detection electrodes, the driving oscillation occurs at an amplitude controlled by the controller. When the supply voltage of this microsystem is switched on, it must be assumed that the movable weight of the sensor element is at rest. Since the electronics of the described system are completely analog, i.e., continuous-value, this system can start oscillating out of the noise, at the resonant frequency of the sensor element, in a manner similar to a quartz oscillator.

SUMMARY

Example embodiments of the present invention provide an oscillating circuit having an analog oscillating element. The oscillating circuit includes at least one analog-to-digital conversion device.

The oscillating circuit may be provided with a mechanical oscillator as an oscillating element, and with an electrical drive circuit that interacts with the mechanical oscillator. In this context, the electrical drive circuit includes an analog-to-digital conversion device. In comparison with conventional, analog signal processing, the digital arrangement may attain advantages with regard to temperature dependence, long-term drift, EMC, and power consumption. A further reason for the digital arrangement is that in the case of modern, densely-packing semiconductor manufacturing processes, it leads to a reduction in the chip area and, consequently, cost savings.

The oscillating element may be a micromechanical oscillator. In the case of micromechanical oscillating circuits, the above-mentioned advantage of cost savings via packing density is particularly large.

The oscillating circuit may have at least one analog-to-digital conversion device. This allows a driving signal of appropriate magnitude to be generated in the drive circuit.

The oscillating circuit may have a filter, in particular a digital filter, for suppressing signals outside of a useful-frequency band. Interference may be filtered out of the drive circuit by filters. This improves the frequency stability of the oscillating circuit.

The oscillating circuit may have a band-pass filter, in particular a digital band-pass filter, for suppressing signals outside of a useful-frequency band. The filtering-out of low-frequency signals may suppress any possible signal offset of the oscillating circuit. The filtering-out of high-frequency signals suppresses disruptive, higher-frequency natural modes of the oscillating circuit.

The oscillating circuit may include a device for digitally evaluating the oscillation amplitude, in particular, changes in the bit having the lowest place value. By this device, it may be detected if an oscillation is actually taking place.

The oscillating circuit may include a device for digitally evaluating the oscillation frequency, in particular a device for counting positive and/or negative zero crossings. By evaluating the frequency, it may be determined if the oscillating circuit is oscillating in the desired mode, or if other modes start to oscillate.

The drive circuit may include a device for measuring the oscillation amplitude of the mechanical oscillator, at least one analog-to-digital conversion device for digitizing the oscillation amplitude, a digital amplitude controller for controlling the oscillation amplitude, and a device for driving the mechanical oscillator. In this manner, an oscillating circuit having a largely digital drive circuit may be provided.

The drive circuit of the oscillating circuit may include at least one digital-to-analog conversion device for generating a driving signal. This allows an analog driving signal of suitable magnitude to be generated at the end of the largely digital drive circuit.

The drive circuit may include a device for inducing an oscillation from the resting position of the mechanical oscillator. This may make it easier for the oscillating circuit having a largely digital drive circuit to start oscillating.

In this connection, the oscillating circuit may include a finite state machine, which activates the device for inducing the oscillation as a function of the oscillation amplitude. The finite state machine allows permanent state monitoring of the oscillating circuit, in particular of the oscillation. If the desired oscillation is not (no longer) occurring for some reason, the finite state machine may then cause the oscillating circuit to start oscillating once more.

The device for inducing the oscillation may be arranged such that a signal for inducing the oscillation may be generated as a function of the oscillation frequency. This allows interfering modes to be suppressed and the desired oscillation mode to be forced. In addition, when the oscillating circuit is caused to start oscillating, such a signal may be generated repeatedly in succession, in phase, for a cumulative effect.

Example embodiments of the present invention further relate to a method for operating an oscillating circuit. An aspect of the method for operating an oscillating circuit is that:

in an ordinary operating state, a mechanical oscillator oscillates at a natural frequency;

the oscillation is measured in a time-resolved manner, using a device for measuring the oscillation amplitude of the mechanical oscillator;

the oscillation amplitude is digitized by an analog-to-digital conversion device;

using a digital amplitude controller, a digital control signal for controlling the oscillation amplitude is generated from the digitized oscillation amplitude;

a driving signal is generated from the digital control signal;

the driving signal is supplied to driving device(s), which drive the mechanical oscillator.

In this connection, parts of the drive circuit of the oscillating circuit may be digital. In comparison with conventional, analog signal processing, the digital arrangement may provide advantages with regard to temperature dependence, long-term drift, EMC, and power consumption. A further reason for the digital arrangement is that in the case of modern, densely-packing semiconductor manufacturing processes, an electrical, in particular, microelectronic drive circuit leads to a reduction in the required chip area and, consequently, to cost savings.

In an extraordinary operating state including a temporally unchangeable, digitized oscillation amplitude, the mechanical oscillator is caused to oscillate using at least one impulse, and the oscillating circuit is therefore induced to pass over into the ordinary operating state. The oscillator may be displaced from the resting position and caused to oscillate by this initial impulse. The displacement of the oscillator following the impulse may allow at least one quantization threshold to be exceeded at the analog-to-digital converter and therefore may allow a meaningful, digital signal analysis.

With the aid of at least one second impulse, the mechanical oscillator may be caused to oscillate and the oscillating circuit is therefore induced to pass over into the ordinary operating state; it being particularly provided that the at least second impulse have such a phase angle with respect to the time of the first impulse and to the natural frequency of the analog oscillation element to be excited, that positive feedback of the oscillation to be excited occurs. The positive feedback inputs additional energy into the mechanical oscillator, which means that the amplitude of the oscillation is successively increased. The natural frequency at which the oscillating circuit is intended to start oscillating may also be selected by suitably selecting the interval of the impulses.

The driving voltage may be maximized as the oscillating circuit starts to oscillate. This may minimize the settling time, i.e., the time from the start-up of the oscillating circuit with a resting mechanical oscillator to the reaching of a stationary oscillating state having a substantially constant oscillating amplitude.

Exemplary embodiments of the present invention are illustrated in the drawings and explained in detail in the following description.

DETAILED DESCRIPTION

Figure 1:
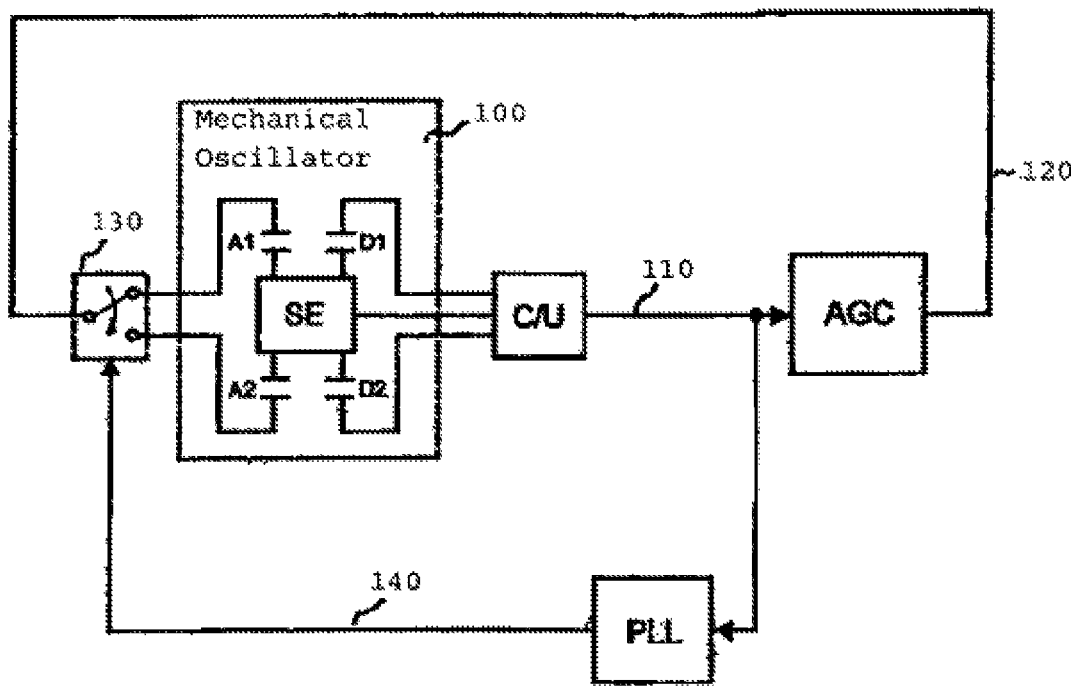
FIG. 1 illustrates a conventional analog oscillating circuit.

FIG. 1 shows a conventional analog oscillating circuit, using a driving oscillating circuit for a yaw-rate sensor as an example.

A rotation-rate sensor, which functions electromechanically and in a completely analog manner, is described in the document "A Low Cost Angular Rate Sensor in Si-Surface Micromachining Technology for Automotive Applications" by A. Thomae, R. Schellin, M. Lang, W. Bauer, J. Morhaupt, G. Bischopink, L. Tanten, H. Baumann, H. Emmerich, S. Pinter, J. Marek, K. Funk, G. Lorenz, R. Neul; SAE, 1999.

A mechanical oscillator 100 is shown, which includes a sensor element SE having a movable, deflectable sensor weight.

In this microsystem, a deflection of the movable sensor weight results in changes in capacitance at micromechanical detection electrodes, which, together with the sensor weight as a counterelectrode, each form capacitor structures, namely detection capacitors D1 and D2. These changes in capacitance are measured by analog electronics having a capacitance-to-voltage converter C/U, and are supplied to a controller AGC as an analog voltage signal 110. In analog controller AGC (automatic gain control), a driving voltage 120 is generated which is applied to further electrodes at sensor element SE via a switching element 130, the further electrodes generating driving capacitors A1 and A2 with SE as a counterelectrode. Driving voltage 120 generates an electrostatic force in sensor element SE. When the periodic driving force is in suitable phase relation with the oscillation of the movable weight measured via detection capacitances D1 and D2, then the driving oscillation occurs at an amplitude controlled by controller AGC. The phase relationship between the oscillation detected at capacitors D1 and D2 and the feedback forces across driving electrodes A1 and A2 is precisely controlled with the aid of a phase-locked loop PLL. To this end, analog voltage signal 110 of the detected oscillation of sensor element SE is supplied to phase-locked loop PLL as an input signal. The phase-locked loop synchronizes with this oscillation and generates a phase signal 140 at the output, the phase signal being supplied to switching element 130 as a control signal. Switching element 130 is consequently switched such that driving voltage 120 is applied, in each instance, to the suitable driving electrode A1 or A2.

When the supply voltage of this microsystem is switched on, it is possible for the movable weight of sensor element SE to be at rest. Since the electronics of the described system are completely analog, i.e., continuously-valued, this system can start oscillating out of the noise, at the natural frequency of the sensor element, in a manner similar to a quartz oscillator.

However, there is an emerging trend of designing as large a part of the signal processing as possible to be digital. In comparison with conventional, analog signal processing, the digital arrangement may attain advantages with regard to temperature dependence, long-term drift, EMC, and power consumption. A further reason for the digital arrangement is that in the case of modern, densely-packing semiconductor manufacturing processes, it leads to a reduction in the chip area and, consequently, to cost savings. In digital signal processing, attempts are made, in the sensor system, to implement the conversion from analog to digital as far towards the beginning of a signal-processing chain as possible. In the case of the yaw-rate sensor, which is used as an exemplary application, the conversion from analog to digital also takes place very early.

Figure 2:
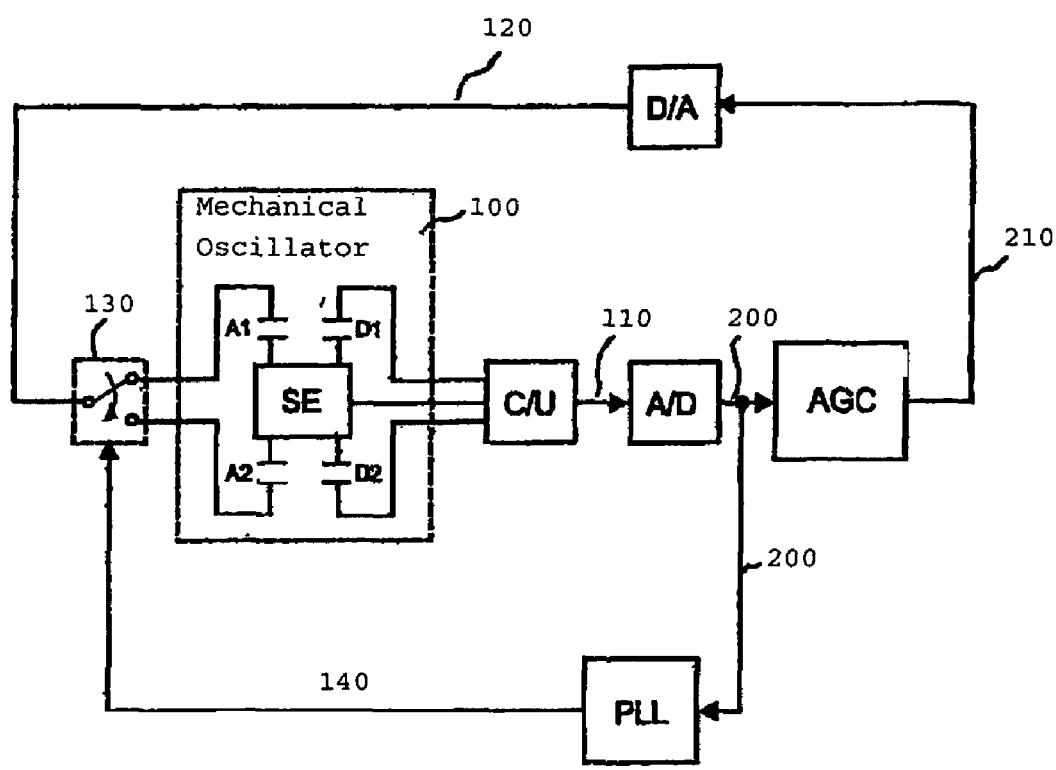
FIG. 2 illustrates an oscillating circuit of an example embodiment of the present invention.

FIG. 2 shows an oscillating circuit of an example embodiment of the present invention. It is to be regarded as a block diagram of the drive circuit of a yaw-rate sensor as an example of an oscillating circuit. As already shown in FIG. 1, mechanical sensor element SE is illustrated, which constitutes an analog oscillating element, i.e., an element having a continuously-valued, changeable oscillation amplitude. An electrical drive circuit is also shown. Two electrodes form, together with sensor element SE as a counterelectrode, two capacitors A1 and A2 that are used for causing the moveable mechanical structure to oscillate with the aid of electrostatic forces. Two other electrodes generate, together with sensor element SE, detection capacitances D1 and D2 that change 180 degrees out of phase in response to a movement of sensor element SE. The two detection capacitances D1 and D2 are used for detecting this movement. To this end, the change in the capacitances at D1 and D2 is converted to an analog voltage signal 110 by an analog capacitance-to-voltage converter C/U. According to example embodiments of the present invention, this analog voltage signal 110 is directly converted to digital, namely to a digital voltage signal 200, by a downstream analog-to-digital converter A/D. A post-connected digital controller AGC (automatic gain control) generates a digital control signal 210 from it, with the aid of which the amplitude of the mechanical oscillation is adjusted to a setpoint value. To this end, digital control signal 210 is supplied, in this example, to a digital-to-analog converter D/A that converts this signal to driving voltage 120. This analog driving voltage 120 is applied, in correct phase relation, to drive capacitors A1 and A2 at sensor element SE, in order to maintain the oscillation of the moveable weight. Driving voltage 120 is applied either to capacitor A1 or to capacitor A2, whereby electrostatic forces on the sensor weight are generated, the algebraic sign of the electrostatic forces being determined by the selection of the driving capacitance. The phase relationship between the oscillation detected at capacitors D1 and D2 and the feedback forces across capacitors A1 and A2 must be controlled in a precise manner. One option for achieving this is, in turn, the use of a phase-locked loop PLL. Phase-locked loop PLL functions substantially as already described with regard to FIG. 1. The input signal of phase-locked loop PLL may be digital voltage signal 200, as shown, in this example, in FIG. 2. However, the input signal of phase-locked loop PLL may also be analog voltage signal 110, as represented in FIG. 1. This is a third example embodiment of the present invention.

The description up to this point applies to an ordinary operating state, namely to a sensor element that is already oscillating. In an oscillating circuit such as the microsystem shown in FIG. 2, there may be a problem, however, when the supply voltage of the system is switched on. In an extraordinary operating state, such as during the start-up of the oscillating circuit, it may be assumed that the moveable weight of sensor element SE is at rest. Therefore, the output of digital-to-analog converter A/D will yield a constant value as a digital voltage signal 200, since the analog noise at the input of the A/D is not sufficient for exceeding a quantization threshold. Consequently, digital phase-locked loop PLL receives a static input signal as a digital voltage signal 200, the digital phase-locked loop not being able to synchronize with the static input signal.

A simple remedy for this problem is to give an impulse to sensor element SE upon start-up, so that the electronics detect the step response of the sensor element and generate a driving voltage 120 in response to it, and that the system ultimately starts to oscillate on the basis of this impulse. This functions when the step response is large enough to exceed a quantization threshold at the input of digital-to-analog converter A/D.

Since analog-to-digital converter A/D quantizes its input signal, there is, however, still the possibility that analog voltage signal 110 at the input of the analog-to-digital converter, which describes the step response of sensor element SE, oscillates back and forth between two quantization threshold values of digital-to-analog converter A/D without exceeding these quantization threshold values. In this case, the output of digital-to-analog converter A/D would then also remain at a static value, and the digital oscillating circuit would not start to oscillate.

Figure 3:
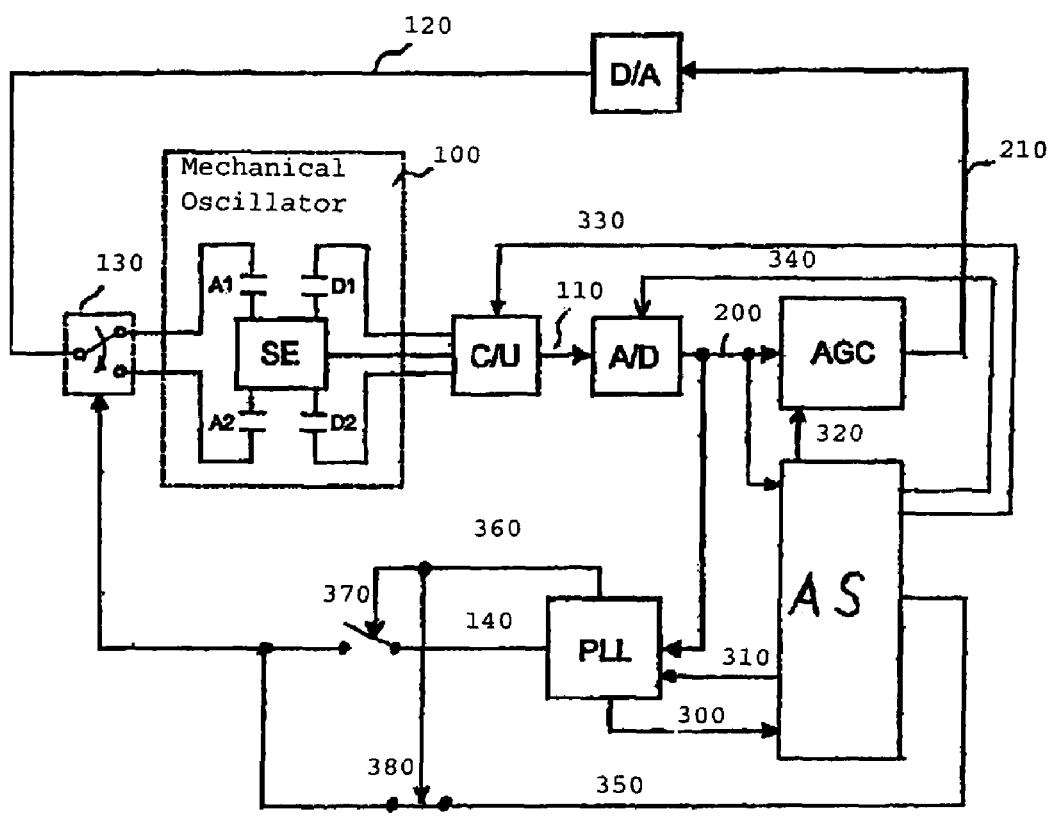
FIG. 3 illustrates an oscillating circuit of an example embodiment of the present invention, having an oscillation build-up circuit.

FIG. 3 shows a digital oscillating circuit of an example embodiment of the present invention, having an oscillation build-up circuit.

In contrast to FIG. 2, the oscillating circuit shown in FIG. 3 provides an oscillation build-up circuit AS for improving the oscillation build-up of the oscillating circuit, the oscillation build-up circuit solving the above-described problem.

A clock signal 300 is transmitted from an oscillator in phase-locked loop PLL to oscillation build-up circuit AS. In addition, digital voltage signal 200 is transmitted to oscillation build-up circuit AS. Oscillation build-up circuit AS transmits an enable signal 310 to phase-locked loop PLL and a controller control signal 320 to digital controller AGC. In addition, a starting-phase signal 350 is transmitted from oscillation build-up circuit AS to switching element 130. A switching element 380 is situated in the signal path of starting-phase signal 350. A switching element 370 is situated in the signal path of phase signal 140 of phase-locked loop PLL. The two switching elements 370 and 380 are connected to a synchronous signal 360 generated by phase-locked loop PLL. The input signal of phase-locked loop PLL may be digital voltage signal 200, as shown in this example in FIG. 3, or analog voltage signal 110, as shown in FIG. 1.

If the oscillating circuit is in the extraordinary operating state, e.g., if it is just being started up, then mechanical oscillator SE is essentially at rest. Analog voltage signal 110 constitutes a signal, which is substantially unchangeable over time and may contain noise. No quantization thresholds are exceeded at analog-to-digital converter A/D, which is why digital voltage signal 200 is constant. Voltage signal 200 is supplied to oscillation build-up circuit AS, where zero values in this oscillation signal are detected. The spacing of the zero values is counted with the aid of clock signal 300. If no zero values are present, then controller AGC is kept at a fixed value with the aid of a controller control signal 320. This occurs, for example, in that the input of controller AGC is held at zero, and a maximum digital control signal 210 is consequently generated at the output of controller AGC. A maximum driving voltage 120 is generated from this with the aid of digital-to-analog converter D/A. Furthermore, phase-locked loop PLL is shut down with the aid of an enable signal 310. Phase-locked loop PLL is no longer synchronized, which is why switching element 370 is opened and switching element 380 closed with the aid of synchronous signal 360. The signal path of phase signal 140 is interrupted, and the signal path of starting-phase signal 350 is connected to switching element 130. The drive circuit emits a first starting-phase signal 350, which actuates switching element 130 and, by applying driving voltage 120 to one of driving capacitors A1 or A2, triggers a first impulse on mechanical oscillator SE. By counting clock signal 300, a second and, in some instances, also further impulses are generated at a suitable phase and frequency for the mechanical oscillator SE to be excited. If quantization thresholds are exceeded at analog-to-digital converter A/D and zero values are consequently detected by oscillation build-up circuit AS, then the phase-locked loop is started up by oscillation build-up circuit AS via enable signal 310. The phase-locked loop then synchronizes with the oscillation. As soon as this has occurred, phase-locked loop PLL switches synchronous signal 360 so that switching element 370 is closed and switching element 380 is opened. The signal path of phase signal 140 is connected to switching element 130, and the signal path of starting-phase signal 350 is interrupted. Consequently, phase-locked loop PLL assumes the phase control of the oscillating circuit, and the ordinary operating state is reached. Drive circuit AS continues to monitor the amplitude and the frequency of oscillation with the aid of digital voltage signal 200, by detecting the zero values and counting the intervals between these zero values. Details of the oscillating circuit and the operating method for such oscillating circuits are discussed in detail below, using the shown exemplary embodiments.

After the supply voltage of the electric drive circuit of the oscillating circuit is switched on, oscillation build-up circuit AS is used for supplying a defined impulse to the mechanical oscillator, namely sensor element SE, measuring the response of sensor element SE, which will be a decaying oscillation at the resonant sensor frequency, and supplying a further impulse to the sensor element in-phase.

According to example embodiments of the present invention, oscillation build-up circuit AS measures the time between two equidirectional zero crossings of the sensor oscillation. In the following, the positive zero crossing is exemplarily selected as a reference. The positive zero crossing is marked, and therefore exemplarily defined in FIG. 5.

The period may be calculated by measuring the time between two positive zero crossings. Starting out from this first measured period, oscillation build-up circuit AS calculates the time in the second oscillator period following the first oscillator period used for measuring, at which time a further impulse must be supplied in-phase to sensor element SE. The length of the second period is also measured by oscillation build-up circuit AS, and the result is used, in turn, for calculating the impulses in the third oscillator period.

According to example embodiments of the present invention, periods are measured by supplying an electronic counter in oscillation built-up circuit AS with a reference clock pulse, which has a frequency considerably greater than the driving-oscillation frequency or natural frequency of sensor element SE. In the exemplary embodiment described in FIG. 3, this is clock signal 300 supplied to oscillation build-up circuit AS by the oscillator in phase-locked loop PLL. With each new positive zero crossing of digital voltage signal 200, a counter in oscillation build-up circuit AS is reset and the counting restarts.

In order to satisfy the oscillating condition of the microsystem made up of mechanics and at least partially digital electronics, an amount of energy sufficient to compensate for all conceivable energy losses at mechanical oscillator SE must be transmitted by the electric drive circuit to mechanical oscillator SE. To this end, the periodic driving impulse generated at driving capacitor A1 or A2 via driving voltage 120 must have a suitable phase relationship for oscillating the movable weight of sensor element SE. A phase shift of 90° is suitable for maximum energy transmission. This relationship is illustrated in FIG. 5.

Figure 5:
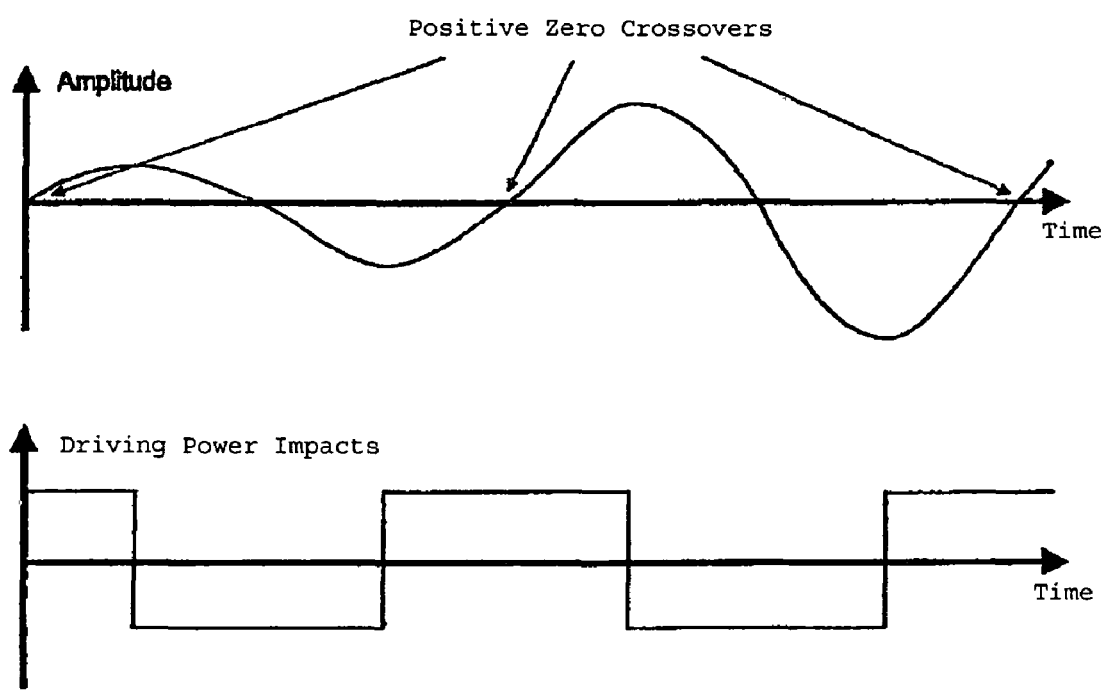
FIG. 5 illustrates the temporal signal pattern of the oscillation amplitude and the impulses initiated by the oscillating circuit.

FIG. 5 shows the temporal signal pattern of the oscillation amplitude and the impulses initiated by the oscillation build-up circuit. In the upper diagram, the oscillation amplitude of the movable weight of sensor element SE is represented versus time, as it is also basically represented by analog voltage signal 110. The positive zero crossings of the oscillation are marked. In the lower diagram, driving impulses are plotted versus time so as to be arranged to maximize energy transmission to the above-represented oscillation.

The start of the impulse is 90° out of phase with respect to the positive zero crossing of the sensor oscillation. The time of the start of the driving impulse is determined by dividing the count representing the length of the last measured oscillator period by 4. When the counter counting up during the currently running measurement of the oscillator period reaches this calculated value, the impulse is introduced by applying a corresponding driving voltage 120 to sensor element SE via appropriate driving electrode A1 or A2. This circuit implementation has the characteristic that the measuring result of the period does not represent a physical time, but only a number of clock pulses. The period of these clock pulses does not have to be exactly defined. This provides the advantage that a very simple clock generator may be used. The stability requirement of the counter pulse is reduced to the counter pulse only being permitted to change moderately from oscillator period to oscillator period. In a simple example embodiment of the present invention, the division by the value of 4 is implemented in a hardware-efficient manner by shifting the digital word representing the count two positions to the right, whereby the valence of the bits of this value is reduced by a factor of 4.

The initialization impulse to sensor element SE, the analog amplifier in capacitance-to-voltage converter C/U in front of analog-to-digital converter A/D, and the quantization thresholds of analog-to-digital converter A/D must be dimensioned such that as a consequence of the impulse, at least one quantization threshold of analog-to-digital converter A/D is definitely exceeded. If the gains of the analog amplifier in capacitance-to-voltage converter C/U and of analog-to-digital converter A/D deviate from the ratings provided for the steady system state, then switchable gains are implemented.

The dimensioning of the gains of the analog amplifier in capacitance-to-voltage converter C/U and of analog-to-digital converter A/D is accomplished by setting the maximum gain for the two blocks directly after the supply voltage is switched on. The gains are incrementally reduced in an event-driven manner with increasing oscillator amplitude of the mechanics. In the example of FIG. 3, this takes place with the aid of an amplifier control signal 330 that switches over the gain of the analog amplifier in capacitance-to-voltage converter C/U, and with the aid of a digital amplifier control signal 340 that switches over the gain of analog-to-digital converter A/D. The gain of the analog amplifier in capacitance-to-voltage converter C/U may be reduced separately from reducing the gain of analog-to-digital converter A/D. During the reduction in the gains, example embodiments of the present invention provide for the mechanical oscillation of the sensor element to always ensure that quantization thresholds are exceeded at analog-to-digital converter A/D.

Depending on the design, the switching-over of the gain in capacitance-to-voltage converter C/U produces the risk that the phase shift caused by analog capacitance-to-voltage converter C/U is a function of the set gain. In this case, example embodiments of the present invention provide for the phase shift occurring in analog capacitance-to-voltage converter C/U to be compensated for by the digital part of oscillation build-up circuit AS. This may be implemented, for example, by changing the calculated count, according to which an impulse should be delivered to the sensor element, by an offset value which compensates for the phase shift due to analog capacitance-to-voltage converter C/U.

Figure 4:
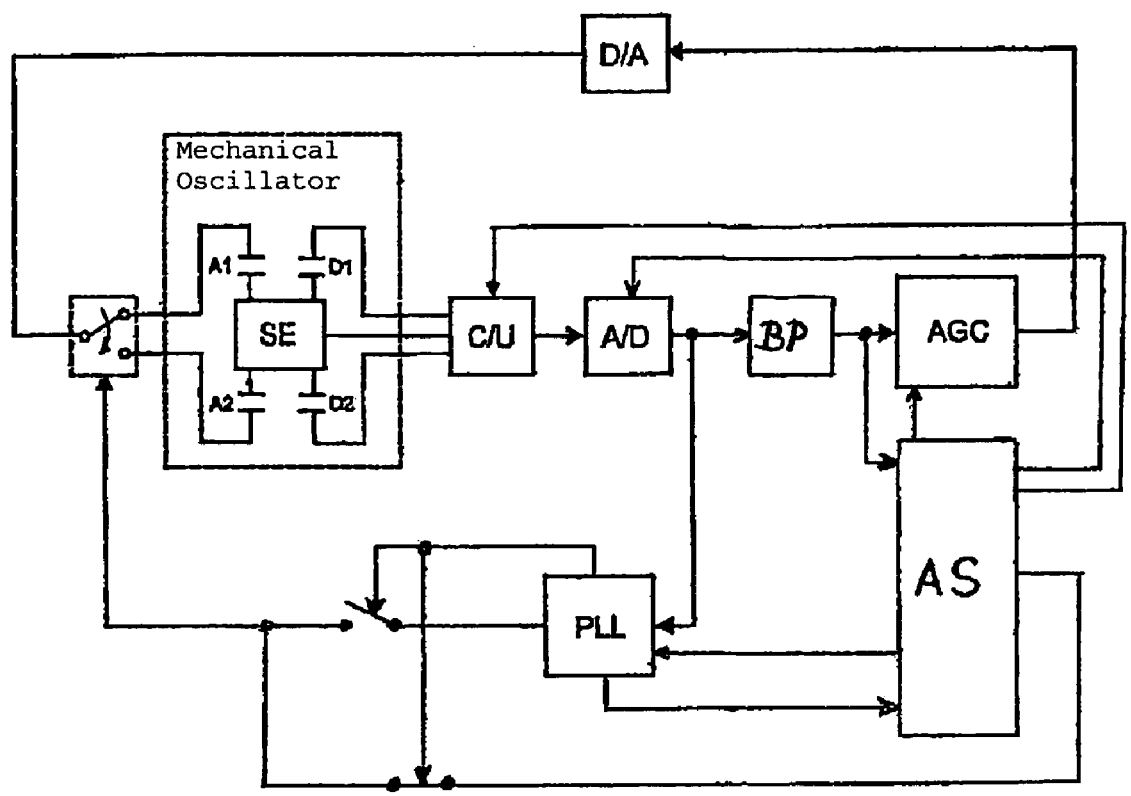
FIG. 4 illustrates an oscillating circuit of an example embodiment of the present invention, having an oscillation build-up circuit and band-pass filter.

FIG. 4 shows a digital oscillating circuit of an example embodiment of the present invention, having an oscillation build-up circuit and band-pass filter. In order to be able to detect zero crossings of the mechanical oscillation independently of a possible signal offset, this example embodiment provides, in addition to the arrangement illustrated in FIG. 3, a band-pass filter BP in the electric drive circuit, in particular in the electronic chain between the mechanics and the electronic zero-crossing detector. Band-pass filter BP additionally provides the advantage that interference in the frequency range above the resonant driving frequency is suppressed as well.

The position directly after analog-to-digital converter A/D constitutes a possible arrangement of band-pass filter BP in the electric drive circuit. Particularly in view of future, high-density semiconductor manufacturing processes, this position provides the advantage that the digital design allows chip area to be conserved, that there is no temperature dependence, and that no long-term drift and few EMC problems are to be feared.

The described, event-driven switchover of the gains may be represented by a digital finite state machine. In the exemplary embodiments according to FIGS. 3 and 4, this finite state machine or this control unit is included in drive circuit AS. When the mechanical oscillator amplitude is sufficiently high and exceeds defined thresholds, a jump from one stat to the next takes place, a corresponding action on the gains in the analog amplifier in capacitance-to-voltage converter C/U or in analog-to-digital converter A/D taking place. There is a risk of an unauthorized state transition occurring due to, for example, electromagnetic interference. Therefore, in each state, return conditions must be provided which ensure that in the case in which no more quantization thresholds are exceeded at the input of analog-to-digital converter A/D and, accordingly, no more zero crossings are detected at the output of band-pass filter BP, a return to the extraordinary operating state occurs.

During the oscillation build-up phase of the electromechanical oscillator, the present invention provides for the voltage for generating the impulses to sensor element SE to be selected to be at a maximum. This is the case until the oscillator amplitude has exceeded a threshold value. According to the present invention, this threshold value is set so close to the setpoint amplitude of the oscillation, that during a large part of the oscillation build-up phase, the magnitude of the impulses to sensor element SE remains at a maximum.

In the described exemplary embodiments of an oscillating circuit in the form of an electromechanical oscillator, the duration of the oscillation build-up phase is minimal due to the continual excitation using impulses of a maximum magnitude. As long as the oscillator amplitude has not yet exceeded the threshold value, the input of digital controller AGC is kept at zero. According to example embodiments of the present invention, controller AGC is only made available to adjust the oscillator amplitude after the threshold value for the oscillator amplitude is exceeded.

A block diagram intended to be used as an example of the drive circuit in a yaw-rate sensor is represented in FIG. 2. According to example embodiments of the present invention, the driving of the PLL in such a drive circuit is controlled by oscillation build-up circuit AS as follows. At the start of the oscillation build-up, phase-locked loop PLL is not enabled, and the clock pulses generated by the PLL are diverted by an oscillator that oscillates at a constant frequency. Phase-locked loop PLL is only enabled and may only lock into the oscillator frequency when the mechanical oscillation has exceeded the threshold amplitude necessary for exceeding quantization thresholds of analog-to-digital converter A/D. This provides the advantage that during the oscillation build-up, the clock-pulse ratios are clearly defined and clocked analog circuits have sufficient time for oscillation build-up, which means that all of the gains in the analog part of the drive circuit are defined. When phase-locked loop PLL is synchronized, the temporal control of the impulses to sensor element SE is also assumed by phase-locked loop PLL.

The objective is for the electromechanical oscillator to start oscillating at the resonant driving frequency of sensor element SE. This objective is put at risk when sensor element SE has a plurality of natural modes, at which the oscillator could start oscillating as well. In an example embodiment of the present invention, the frequency band in which the electromechanical oscillator may start oscillating is limited to a frequency range, in the center of which the desired resonant driving frequency lies. According to example embodiments of the present invention, the width of the allowed frequency range in which impulses may be supplied to sensor element SE is selected in such a manner, that the frequencies of the unwanted natural modes are outside of the permitted frequency range. An exemplary option for implementing this is to intervene in the measuring of the period, which was already described in principle with regard to FIG. 3. The period is measured by measuring the number of reference clock pulses between two positive zero crossings with the aid of an electronic counter. According to example embodiments of the present invention, the validity of a detected, positive zero crossing is now made a function of the current state of the counter. In order to suppress, for example, frequencies that are too high, positive zero crossings are only accepted as valid at or above a particular count (threshold count). When a positive zero crossing is detected before the threshold count has been reached, the zero crossing is ignored and the counter continues to count until a positive zero crossing is detected, which is greater than the threshold count. In this manner, the excitation of an unwanted, natural sensor mode is prevented.

The oscillator is excited by a series of pulses or impulses. There is a risk of the edges of these pulses interfering with the measurement of the oscillator amplitude, due to overcoupling. This risk may especially be present during oscillation build-up, due to an extremely small oscillator amplitude. In order to prevent problems resulting from this, example embodiments of the present invention provide for the edges of the pulses and the measurements of the amplitude to be separated in the time interval (time-division multiplex). The measurement is conducted in a discrete-time manner in a defined time interval in which no pulse edge is active.

Further exemplary embodiments are also possible, in particular, combinations of individually represented features of the different example embodiments of the present invention.

What is claimed is:

1. An oscillating circuit, comprising:
    an analog oscillation element;
    at least one analog-to-digital conversion device,
    wherein the oscillating element includes a mechanical oscillator, the oscillating circuit further comprising an electrical drive circuit that interacts with the mechanical oscillator, the electrical drive circuit including the analog-to-digital conversion device, wherein the drive circuit includes:
- a device configured to measure an oscillation amplitude of the mechanical oscillator;
- at least one analog-to-digital conversion device configured to digitize the oscillation amplitude;
- a digital amplitude controller configured to control the oscillation amplitude;
- at least one digital-to-analog conversion device configured to generate a driving signal; and
- a device configured to drive the mechanical oscillator
- a device configured to induce an oscillation from a resting position of the mechanical oscillator; and
- a finite state machine configured to activate the device configured to induce the oscillation as a function of an oscillation amplitude.

2. The oscillating circuit according to claim 1, wherein the oscillation element includes a micromechanical oscillator.

3. The oscillating circuit according to claim 1, further comprising at least one digital-to-analog conversion device.

4. The oscillating circuit according to claim 1, further comprising at least one of (a) a filter and (b) a digital filter configured to suppress signals outside of a useful-frequency band.

5. The oscillating circuit according to claim 4, further comprising at least one of (a) a band-pass filter and (b) a digital band-pass filter configured to suppress signals outside of a useful-frequency band.

6. The oscillating circuit according to claim 1, further comprising a device configured to digitally evaluate at least one of (a) an oscillation amplitude and (b) changes in a bit having a lowest place value.

7. The oscillating circuit according to claim 1, further comprising a device configured to at least one of (a) digitally evaluate an oscillation frequency and (b) count at least one of (i) positive and (ii) negative zero crossings.

8. The oscillating circuit according to claim 1, wherein the device configured to induce the oscillation is configured such that a signal for inducing the oscillation is generatable as a function of an oscillation frequency.

9. A method for operating an oscillating circuit, comprising,
- in an ordinary operating state, oscillating a mechanical oscillator at a natural frequency;
- measuring the oscillation in a time-resolved manner, using a device for measuring an oscillation amplitude of the mechanical oscillator;
- digitizing the oscillation amplitude by an analog-to-digital conversion device;
- using a digital amplitude controller, generating a digital control signal for controlling the oscillation amplitude from the digitized oscillation amplitude;
- generating a driving signal from the digital control signal;
- supplying the driving signal to a driving device that drives the mechanical oscillator; and
- in an extraordinary operating state having a temporally unchangeable, digitized oscillation amplitude, using at least one impulse, causing the mechanical oscillator to oscillate and consequently causing the oscillating circuit to enter the ordinary operating state.

10. The method according to claim 9, further comprising, using at least one second impulse, causing the mechanical oscillator to oscillate and consequently causing the oscillating circuit to enter the ordinary operating state, the at least one second impulse having a phase angle with respect to a time of the at least one impulse and the natural frequency of the analog oscillation element to be excited, that positive feedback of the oscillation to be induced occurs.

11. A method for operating an oscillating circuit, comprising,
- in an ordinary operating state, oscillating a mechanical oscillator at a natural frequency;
- measuring the oscillation in a time-resolved manner, using a device for measuring an oscillation amplitude of the mechanical oscillator;
- digitizing the oscillation amplitude by an analog-to-digital conversion device;
- using a digital amplitude controller, generating a digital control signal for controlling the oscillation amplitude from the digitized oscillation amplitude;
- generating a driving signal from the digital control signal;
- supplying the driving signal to a driving device that drives the mechanical oscillator; and
- maximizing the driving signal during an oscillation build-up of the oscillating circuit.

12. The method according to claim 10, further comprising determining a phase relation of the oscillation in a device for digitally evaluating the oscillation frequency by counting positive and/or negative zero crossings, only counter results corresponding to an oscillation frequency in a stipulated frequency band being rated as valid.

13. A method for operating an oscillating circuit, comprising,
- in an ordinary operating state, oscillating a mechanical oscillator at a natural frequency;
- measuring the oscillation in a time-resolved manner, using a device for measuring an oscillation amplitude of the mechanical oscillator;
- digitizing the oscillation amplitude by an analog-to-digital conversion device;
- using a digital amplitude controller, generating a digital control signal for controlling the oscillation amplitude from the digitized oscillation amplitude;
- generating a driving signal from the digital control signal;
- supplying the driving signal to a driving device that drives the mechanical oscillator;
- in a device for digitally evaluating the oscillation amplitude, evaluating the digitized oscillation amplitude;
- controlling a gain of the analog-to-digital conversion device and of further analog amplifiers as a function of the oscillation amplitude; and
- compensating for gain-dependent phase shifts, which occur in analog-to-digital conversion device in further analog amplifiers, during subsequent evaluation of the digitized oscillation amplitude in a device for digitally evaluating the oscillation frequency.

14. The method according to claim 13, wherein the compensating includes adding a phase shift as a function of the controlled gain from a phase angle of the oscillation determined in the device for digitally evaluating the oscillation frequency.

* * * * *